US012790432B2

(12) United States Patent
Johnson et al.

(10) Patent No.: US 12,790,432 B2
(45) Date of Patent: Nov. 10, 2026

(54) TUNABLE DEGRADATION OF ESTER-BASED EPOXY FORMULATIONS

(71) Applicant: Research Triangle Institute, Research Triangle Park, NC (US)

(72) Inventors: Leah Marie Johnson, Durham, NC (US); Nicolas Daniel Huffman, Raleigh, NC (US); Jeffrey Brent Mecham, Raleigh, NC (US); Ian Edward Stewart, Durham, NC (US); Natalie Marie Girouard, Apex, NC (US)

(73) Assignee: RESEARCH TRIANGLE INSTITUTE

( * ) Notice: Subject to any disclaimer, the term of this patent is extended or adjusted under 35 U.S.C. 154(b) by 0 days.

(21) Appl. No.: 17/795,476

(22) PCT Filed: Jan. 26, 2021

(86) PCT No.: PCT/IB2021/050599

§ 371 (c)(1),
(2) Date: Jul. 26, 2022

(87) PCT Pub. No.: WO2021/152460

PCT Pub. Date: Aug. 5, 2021

(65) Prior Publication Data

US 2023/0069918 A1 Mar. 9, 2023

Related U.S. Application Data

(60) Provisional application No. 62/966,190, filed on Jan. 27, 2020.

(51) Int. Cl.
*B32B 1/00* (2024.01)
*B32B 27/38* (2006.01)
*C08G 59/50* (2006.01)

(52) U.S. Cl.
CPC .................................. *C08G 59/502* (2013.01)

(58) Field of Classification Search
None
See application file for complete search history.

(56) References Cited

U.S. PATENT DOCUMENTS

| | | | | |
|---|---|---|---|---|
| 10,308,864 | B2 | 6/2019 | Rothrock et al. | |
| 11,571,674 | B1 * | 2/2023 | Dihora | B01J 13/16 |
| 2006/0166838 | A1 | 7/2006 | Collins et al. | |
| 2010/0307745 | A1 | 12/2010 | Lafitte et al. | |
| 2013/0137572 | A1 * | 5/2013 | Fowler | C05G 5/27 504/348 |
| 2013/0203601 | A1 * | 8/2013 | Fowler | A01N 25/26 424/419 |
| 2014/0274720 | A1 * | 9/2014 | Kims | A01N 25/04 504/360 |
| 2019/0031951 | A1 | 1/2019 | Johnson et al. | |

OTHER PUBLICATIONS

Shen, Minjie et al. "Accelerated Hydrolytic Degradation of Ester-Containing Biobased Epoxy Resins." Polymer chemistry 1.23 (2019): 3217-3229. Web. (Year: 2019).*

Shen et al., "Accelerated Hydrolytic Degradation of Ester-Containing Biobased Epoxy Resins," *Polymer Chemistry*, 2019, vol. 10, No. 23, pp. 3217-3229.

* cited by examiner

*Primary Examiner* — Michael J Feely
(74) *Attorney, Agent, or Firm* — WOMBLE BOND DICKINSON (US) LLP

(57) ABSTRACT

The present disclosure relates to delivery and release compositions, systems, and methods of use thereof. In particular, the present disclosure relates to degradable polymeric systems including a first epoxy-containing monomer and a second, different epoxy-containing monomer, wherein the degradable polymeric system is crosslinked, and wherein one of the first epoxy-containing monomer and the second, different epoxy-containing monomer includes one or more ester groups; delivery systems incorporating degradable polymeric systems; and methods for providing cargo to a petroleum reservoir.

15 Claims, 8 Drawing Sheets

| | $T_{g1}$ (°C) | |
|---|---|---|
| **5200:862 Ratio** | **Prior to HPHT** | **1 Day HPHT** |
| 100:0 | 57.0 ± 2.8 | 4.77 ± 0.5 |
| 80:20 | 54.7 ± 0.1 | 31.3 ± 8.5 |
| 60:40 | 54.7 ± 1.2 | 37.7 ± 2.0 |
| 20:80 | 87.6 ± 0.9 | 58.3 ± 0.7 |
| 0:100 | 88.3 ± 0.9 | 90.0 ± 1.3 |

FIG. 7

TUNABLE DEGRADATION OF ESTER-BASED EPOXY FORMULATIONS

CROSS-REFERENCE TO RELATED APPLICATIONS

The present application is a U.S. National Stage of International Patent Application PCT/IB2021/050599, filed Jan. 26, 2021, and claims priority to U.S. Provisional Patent Application No. 62/966,190, filed Jan. 27, 2020. The disclosures of each of the applications noted above are incorporated herein by reference in their entirety.

FIELD OF THE DISCLOSURE

The present disclosure relates to delivery and release compositions, systems, and methods of use thereof. In particular, the present disclosure provides engineered release and stimuli-responsive materials adapted to release a desired chemical or composition in a desired location, such as downhole in a petroleum well and/or formation.

BACKGROUND

There is a need in many industries for delivery and release of various chemistries in a controlled manner. Emerging materials, such as nanoparticles, stimuli-responsive polymers, and chemical sensor technologies, have been shown to be useful in fields where the point of delivery is a controlled environment, such as with personal care materials and pharmaceuticals. Although it would be useful to employ controlled delivery and release methods and materials in other environments, such as in the petroleum industry, the harsh and generally uncontrolled nature of the downhole environment has heretofore prevented useful implementation of such controlled release technologies. It would be particularly desirable to have controlled delivery and release methods and materials for use in a variety of oilfield operations, such as well completions, enhanced oil recovery ("EOR"), and flow control. The challenging downhole environment, however, requires a new set of chemistries, manufacturing processes, and activation mechanisms to provide for actual field utility. Further, due to this challenging environment, as well as the relatively high cost of oilfield chemicals and sensors, there is a need for improved methods and materials with targeted release from the wellbore region to the deep reservoir.

SUMMARY OF THE DISCLOSURE

The present disclosure relates to a degradable polymeric system comprising a first epoxy-containing monomer and a second, different epoxy-containing monomer, wherein the degradable polymeric system is crosslinked, and wherein one of the first epoxy-containing monomer and the second, different epoxy-containing monomer includes one or more ester groups. In some embodiments, the degradability of the polymeric system is tunable based upon the weight percentage of the polymeric system that is formed by the epoxy-containing monomer including the one or more ester groups. In some embodiments, the degradable polymeric system is crosslinked with an amine crosslinker.

The present disclosure further relates to delivery systems that can be particularly useful in delivery of a variety of chemicals and chemical compositions to harsh environments, such as petroleum formations. In various embodiments, a delivery system can comprise a plurality of particles that each comprise an outer shell and a cargo that is retained by the outer shell, wherein the outer shell is at least partially formed from a degradable polymeric system as otherwise described herein. In further embodiments, the delivery systems can be defined in relation to one or more of the following statements, which can be combined in any number and/or order.

The outer shell can define an interior space in which the cargo is retained.

The outer shell can comprise a plurality of layers.

The interior space can comprise a core material with which the cargo is combined.

The cargo can be configured as a plurality of units within the interior space defined by the shell.

The cargo can be controllably diffusible through the shell.

The outer shell can be at least partially degradable.

The outer shell can be at least partially degradable via a mechanism selected from the group consisting of hydrolytic degradation.

The cargo can comprise at least one material selected from the group consisting of breakers, scale inhibitors, corrosion inhibitors, cross linkers, surfactants, cement accelerators, acidizing agents, sensors, bactericides, formation damage control agents, emulsifiers, viscosifiers, tracers, and combinations thereof.

The particles can have an average size of about 5 μm or less.

The particles can have an average size of about 500 nm or less.

The present disclosure further can provide methods for delivering a cargo to a desired location, such as a petroleum reservoir. In one or more embodiments, a method for providing a cargo to a petroleum reservoir can comprise delivering to the petroleum reservoir a plurality of particles that each comprise an outer shell that is retaining the cargo, wherein the outer shell is at least partially formed from a degradable polymeric system, and wherein the petroleum reservoir exhibits one or more conditions under which the plurality of particles release at least a portion of the cargo. In further embodiments, the delivery methods can be defined in relation to one or more of the following statements, which can be combined in any number and/or order.

The outer shell can be formed from a degradable polymeric system.

The petroleum reservoir can exhibit one or more conditions under which the degradable polymeric system at least partially degrades.

The degradation of the degradable polymeric system can be tuned by controlling the weight percentage of the polymeric system that is formed by the epoxy-containing monomer including the one or more ester groups.

The degradable polymeric system can be tuned to provide a triggered release of specific cargo components.

The outer shell can define an interior space in which the cargo is retained.

The outer shell can comprise a plurality of layers.

The interior space can comprise a core material with which the cargo is combined.

The cargo can be configured as a plurality of units within the interior space defined by the shell.

The cargo can controllably diffuse through the outer shell in the petroleum reservoir.

The cargo can comprise at least one material selected from the group consisting of breakers, scale inhibitors, corrosion inhibitors, crosslinkers, surfactants, cement accelerators, acidizing agents, sensors, bactericides, formation damage control agents, emulsifiers, viscosifiers, tracers, and combinations thereof.

The particles can have an average size of about 500 μm or less

The particles can have an average size of about 1 μm or less.

The particles can have an average size of about 500 nm or less.

In one or more embodiments, the present disclosure can provide controlled release particles that can comprise the cargo as the majority component. Particularly, the cargo can comprise up to about 90% by weight of the particles (e.g., about 10% by weight to about 90% by weight) based on the total weight of the particles. Such particles can be in a multi-layer form and can include one or more labile cross-links in one or more of the layers to provide for controlled release of the cargo.

The present disclosure further can provide methods for preparing degradable polymeric systems. In one or more embodiments, a method for preparing a degradable polymeric system can comprise combining a first epoxy-containing monomer with a second, different epoxy-containing monomer, wherein one of the first epoxy-containing monomer and the second, different epoxy-containing monomer includes one or more ester groups to form a combination of monomers; mixing the combination of monomers with a crosslinker; and allowing the monomers to crosslink and form the degradable polymeric system. In some embodiments, the crosslinker is an amine and in certain embodiments, the crosslinker is triethylenetetramine ("TETA"). In some embodiments, the combination of monomers is mixed with the crosslinker in a 1:1 stoichiometric M ratio. In various embodiments, the methods for preparing a degradable polymeric system may further comprise adding a diluent. In some embodiments, the diluent is added to the degradable polymeric system in an amount of 10 percent by weigh. In some embodiments, the ratio of first epoxy-containing monomer to second, different epoxy-containing monomer can be between about 99:1 to about 1:99 by weight percent.

The invention includes, without limitation, the following embodiments.

Embodiment 1: A degradable polymeric system comprising a first epoxy-containing monomer and a second, different epoxy-containing monomer, wherein the degradable polymeric system is crosslinked, and wherein one of the first epoxy-containing monomer and the second, different epoxy-containing monomer includes one or more ester groups.

Embodiment 2: The degradable polymeric system of embodiment 1, wherein degradability of the polymeric system is tunable based upon the weight percentage of the polymeric system that is formed by the epoxy-containing monomer including the one or more ester groups.

Embodiment 3: The degradable polymeric system of embodiment 1 or 2, wherein the degradable polymeric system is crosslinked with an amine crosslinker.

Embodiment 4: A delivery system comprising a plurality of particles that each comprise an outer shell and a cargo that is retained by the outer shell, wherein the outer shell is at least partially formed from a degradable polymeric system according to any one of embodiments 1-3.

Embodiment 5: The delivery system of embodiment 4, wherein the outer shell defines an interior space in which the cargo is retained, and the outer shell comprises a plurality of layers.

Embodiment 6: The delivery system of embodiment 4 or 5, wherein the outer shell defines an interior space in which the cargo is retained, and the interior space comprises a core material with which the cargo is combined.

Embodiment 7: The delivery system of any one of embodiments 4-6, wherein the outer shell defines an interior space in which the cargo is retained, and the cargo is configured as a plurality of units within the interior space defined by the shell.

Embodiment 8: The delivery system of any one of embodiments 4-7, wherein the outer shell defines an interior space in which the cargo is retained, and the cargo is controllably diffusible through the outer shell.

Embodiment 9: The delivery system of any one of embodiments 4-8, wherein the degradable polymeric system is at least partially degradable via a mechanism selected from the group consisting of hydrolytic degradation.

Embodiment 10: The delivery system of any one of embodiments 4-9, wherein the cargo comprises at least one material selected from the group consisting of breakers, scale inhibitors, corrosion inhibitors, crosslinkers, surfactants, cement accelerators, acidizing agents, sensors, bactericides, formation damage control agents, emulsifiers, viscosifiers, tracers, and combinations thereof.

Embodiment 11: The delivery system of any one of embodiments 4-10, wherein the particles have an average size of about 5 μm or less.

Embodiment 12: The delivery system of any one of embodiments 4-11, wherein the particles have an average size of about 1 μm or less.

Embodiment 13: The delivery system of any one of embodiments 4-12, wherein the particles have an average size of about 500 nm or less.

Embodiment 14: A method for providing a cargo to a petroleum reservoir, the method comprising delivering to the petroleum reservoir a delivery system according to any one of embodiments 4-13, wherein the petroleum reservoir exhibits one or more conditions under which the plurality of particles release at least a portion of the cargo.

Embodiment 15: The method of embodiment 14, wherein the degradable polymeric system is at least partially degradable, and the petroleum reservoir exhibits one or more conditions under which the degradable polymeric system at least partially degrades.

Embodiment 16: The method of embodiment 14 or 15, wherein the degradation of the degradable polymeric system is tuned by controlling the weight percentage of the polymeric system that is formed by the epoxy-containing monomer including the one or more ester groups.

Embodiment 17: The method of any one of embodiments 14-16, wherein the degradable polymeric system is tuned to provide a triggered release of specific cargo components.

Embodiment 18: A method for preparing a degradable polymeric system comprising: combining a first epoxy-containing monomer with a second, different epoxy-containing monomer, wherein one of the first epoxy-containing monomer and the second, different epoxy-containing monomer includes one or more ester groups to form a combination of monomers;

mixing the combination of monomers with a crosslinker; and allowing the monomers to crosslink and form the degradable polymeric system.

Embodiment 19: The method of embodiment 18, wherein the crosslinker is an amine Embodiment 20: The method of embodiment 18 or 19, wherein the crosslinker is triethylenetetramine (TETA).

Embodiment 21: The method of any one of embodiments 18-20, wherein the combination of monomers is mixed with the crosslinker in a 1:1 stoichiometric M ratio.

Embodiment 22: The method of any one of embodiments 18-21, further comprising adding a diluent.

Embodiment 23: The method of any one of embodiments 18-22, wherein diluent is added to the degradable polymeric system in an amount of 10 percent by weight.

Embodiment 24: The method of any one of embodiments 18-23, wherein the ratio of first epoxy-containing monomer to second, different epoxy-containing monomer is between about 99:1 to about 1:99 by weight percent.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as combinable unless the context clearly dictates otherwise.

BRIEF DESCRIPTION OF THE FIGURES

Reference will now be made to the accompanying drawings, which are not necessarily drawn to scale, and wherein:

FIG. 7 shows a table listing the $T_g$ values of all epoxy formulations, prepared according to the methods described herein, after one day of high pressure and high temperature exposure;

DETAILED DESCRIPTION

Figure 1:
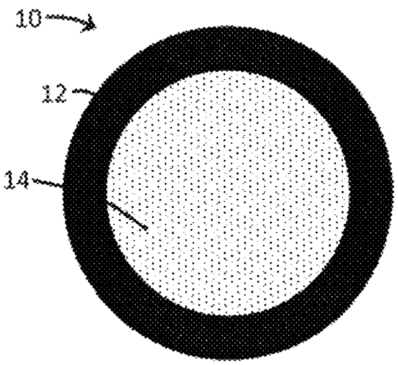
FIG. 1 shows a cross-section of a multi-component particle according to one or more embodiments of the present disclosure.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one or more embodiments, the present disclosure provides delivery and release compositions and systems and methods of use thereof. The compositions and systems can include a plurality of particles that are configured to retain a cargo under a certain condition but release at least a portion of the cargo under one or more different conditions. For example, the release conditions can be conditions that are typically present in a petroleum bearing formation. The disclosure thus can provide engineered release and stimuli-responsive materials that are configured particularly for use in a downhole environment, which typically exhibits conditions that are significantly different from standard atmospheric conditions (e.g., standard temperature and pressure—about 70° C. and about 15 psi). The compositions and system can be especially useful for delivery of oilfield chemicals, such as surfactants, stimulation agents, breakers, scale inhibitors, and metal salts (as non-limiting examples) in various oilfield applications, such as production enhancement, well constructions, and flow assurance.

In some embodiments, systems and methods according to the present disclosure may be useful in relation to hydrocarbon-bearing reservoirs. For example, the present systems and methods can be adapted for use with a variety of technologies useful for exploration, development, and/or production of hydrocarbons from reservoirs. Enhanced oil recovery technologies and the like are non-limiting examples of technologies that can benefit from the present systems and methods. Because of the harshness of the conditions that are typical in hydrocarbon-bearing reservoirs, the present delivery and release systems are particularly beneficial in that they are adapted to provide intact delivery of a material to environments, even under such harsh conditions. Embodiments of the present systems thus can be useful in a wide variety of instances where delivery of a material in a hydrocarbon-bearing reservoir may be beneficial to evaluate a condition of the reservoir, identify a property of the reservoir, improve removal of a hydrocarbon from the reservoir, or the like.

Advantageously, the degradable polymeric systems described in the present disclosure allow for hydrolytic cleavage of aliphatic ester bonds which can be leveraged as a method for release of cargo components under one or more specific conditions. Degradable polymeric systems as described herein can be useful in various industries where encapsulating situation specific cargo for triggered release could be beneficial. For examples, suitable uses of the degradable polymeric systems described herein may include, but are not limited to: the oil and gas industry, the food industry, water remediation applications, and a variety of Alternative applications requiring various different chemistries. The methods described herein can be particularly beneficial in the oil and gas industry; for example, chemicals for use in enhanced oil recovery may benefit from the use of the systems and methods as described herein. Particularly, degradation of these polymeric systems can be tuned to release cargo components over targeted time frames as a function of the stoichiometric ester content of the crosslinked system. These degradable polymeric systems and methods for making such degradable polymeric systems are described in further detail herein below.

In some embodiments, the present disclosure relates to a degradable polymeric system comprising a first epoxy-containing monomer and a second, different epoxy-containing monomer, wherein the degradable polymeric system is crosslinked, and wherein one of the first epoxy-containing monomer and the second, different epoxy-containing monomer includes one or more ester groups. In some embodiments, the degradability of the polymeric system is tunable based upon the weight percentage of the polymeric system that is formed by the epoxy-containing monomer including the one or more ester groups. Suitable epoxy-containing monomers may include, but are not limited to: monofunctional diluents, difunctional diluents, trifunctional diluents, Bisphenol-A, Bisphenol-F, novolac, and polyfunctional epoxy resins. In some embodiments, the degradable polymeric system is crosslinked with an amine crosslinker.

Suitable methods for preparing such degradable polymeric systems as described above are also provided herein. For example, in some embodiments, methods for preparing degradable polymeric systems may comprise combining a first epoxy-containing monomer with a second, different epoxy-containing monomer, wherein one of the first epoxy-containing monomer and the second, different epoxy-containing monomer includes one or more ester groups to form a combination of monomers; mixing the combination of monomers with a crosslinker; and allowing the monomers to crosslink and form the degradable polymeric system. In some embodiments, the one or more ester groups may be incorporated in the backbone of the epoxy-containing monomer. In some embodiments, the crosslinker may preferably be an amine crosslinker. Suitable amine crosslinkers include tertiary amines, or preferably secondary amines, or more preferably primary amines Other suitable amines may be selected from the group consisting of aliphatic amines, cycloaliphatic amines, and aromatic amines Amine crosslinkers are particularly beneficial for their ability to form chemical bonds with numerous synthetic chemical groups such as the epoxy-containing monomers described herein. In some embodiments, the amine crosslinker is present in a stoichiometric amount relative to the epoxy groups in the epoxy containing monomer and is configured to interact with the epoxy groups in the epoxy-containing monomers.

Methods for preparing degradable polymeric systems of the present disclosure may further comprise adding a diluent. In some embodiments, the diluent may be added to the degradable polymeric system in an amount of about 1 weight percent to about 20 weight percent, or about 5 weight percent to about 15 weight percent, or preferably about 10 weight percent. For example, in some embodiments, the diluent may be one of C8-C10 alkyl glycidyl ether, C12-C14 alkyl glycidyl ether, neodecanoic acid glycidyl ether, butyl glycidyl ether, cresyl glycidyl ether, phenyl glycidyl ether, p-nonylphenyl glycidyl ether, p-t-butyl phenyl glycidyl ether, 2-ethylhexyl glycidyl ether, 1,4-butanediol diglycidyl ether, neopentyl glycol diglycidyl ether, dimer acid diglycidyl ester, cyclohexane dimethanol diglycidyl ether, trimethylolpropane triglycidylether, aliphatic polyglycidyl ether, or castor oil polyglycidyl ether. Further, the ratio of the first epoxy-containing monomer to the second, different epoxy-containing monomer is between about 99:1 and about 1:99 by weight percent.

Compositions and systems of the present disclosure can comprise a cargo component that is delivered to a desired location for a desired purpose and an outer shell component that is initially in combination with the cargo but releases the cargo after delivery to the desired location. The cargo and outer shell can be assembled so as to form a plurality of particles that can take on a variety of configurations. The particles can substantially prevent release of the cargo for a certain time period and then allow release of the cargo thereafter, and the delayed release can be adjusted to the time necessary for the compositions to reach the desired location. For example, when delivered to a petroleum formation, the particles can remain substantially intact so that the cargo is not released during pumping down the wellbore; however, the particles can undergo a change after passing from the wellbore into the formation so that at least a portion of the cargo is released in the formation.

The outer shell component of the particles can be formed of a degradable polymeric system, as previously described. As noted above, such degradable polymeric systems may comprise a first epoxy-containing monomer and a second, different epoxy-containing monomer, wherein the degradable polymeric system is crosslinked, and wherein one of the first epoxy-containing monomer and the second, different epoxy-containing monomer includes one or more ester groups. In some embodiments, the degradability of the degradable polymeric system is tunable based upon the weight percentage of the polymeric system that is formed by the epoxy-containing monomer including the one or more ester groups. In various embodiments, as noted above, the degradable polymeric system may be crosslinked with an amine crosslinker.

The cargo material included in the particles of the present disclosure can comprise any material that is desired for delivery and that can be unitized in substantially small sizes to be amenable to being particularized in size ranges described herein. In one or more embodiments, a cargo material can be aqueous, lipophilic, polymeric, gaseous, organic, or any combination thereof. The nature of the outer shell may be chosen based upon the nature of the cargo. For example, it may be desirable in some embodiments to a lipophilic outer shell to carry lipophilic cargo. Other combinations are also encompassed by the present disclosure.

In some embodiments, a cargo material can particularly be a material that is suitable for use in the petroleum industry, specifically chemicals, chemical compositions, and chemical systems that may be pumped downhole in a petroleum well. In some embodiments, the cargo can be configured specifically for delivery into a petroleum formation—i.e., into the pores of the formation. Non-limiting examples of materials that may be delivered as a cargo component according to the present disclosure include breakers, scale inhibitors, corrosion inhibitors, cross linkers, surfactants, cement accelerators, acidizing agents, sensors, bactericides, formation damage control agents, emulsifiers, viscosifiers, tracers, and combinations thereof.

Non-limiting examples of breakers that may be used according to the present disclosure include peroxydisulfates, organic peroxides, enzymes, oxidizing agents, acids, and combinations thereof.

Non-limiting examples of scale inhibitors that may be used according to the present disclosure include sodium hydroxide, calcium carbonate, sodium bicarbonate, potassium hydroxide, magnesium oxide, calcium oxide, polyacrylates, polyphosphates, phosphonates, and combinations thereof.

Non-limiting examples of corrosion inhibitors that may be used according to the present disclosure include ammonium sulfites, bisulfite blends, zinc carbonate, zinc chromate, hydrated lime, fatty amine salts of alkylphosphates, cationic polar amines, ethoxylated amines, tertiary cyclic amines, tertiary cyclic amines, carbonates, and combinations thereof.

Non-limiting examples of cross linkers that may be used according to the present disclosure include Zr(IV), organotitanates, borates, zirconium compounds, organozirconeates, antimonates, aluminum compounds, polyamines, tetramethylenediamine, methanol, sodium thiosulfate, sodium dithiocarbamate, alkanolamine, thiols, imidazolines, calcinated dolomite, Cu(I), Cu(II), and combinations thereof.

Non-limiting examples of formation damage control agents that may be used according to the present disclosure include potassium chloride, ammonium chloride, sodium chloride, gypsum, sodium silicate, polyacrylamide, poly (acrylamide-co-acrylic acid), quaternary ammonium polymers, lignosulfonate derivatives, xanthan gum, guar gum, sodium poly(styrene sulfonate-co-maleic anhydride), PEO, hydroxyl ethyl cellulose, silicon halides, foams, and combinations thereof.

Non-limiting examples of surfactants in the particle include fluorochemicals, polyacrylamide, acrylamide copolymers, guar gum, HEC, karaya gum, organic amines, quaternary ammonium salts, alkylphenol ethoxylates, poly(ethylene oxide-co-propylene glycol, alkyl or alkylaryl polyoxyalkylene phosphate esters, and combinations thereof.

Non-limiting examples of acidizing agents that may be used according to the present disclosure include fumaric acid, formic acid, hydrochloric acid, acetic acid, hydrofluoric acid, sulfamic acid, chloroacetic acid, and combinations thereof.

Non-limiting examples of bactericides that may be used according to the present disclosure include paraformaldehyde, glutaraldehyde, sodium hydroxide, lime derivatives, dithiocarbamates, isothiazolones, diethylamine, chlorophenates, quaternary amines, and combinations thereof.

Non-limiting examples of emulsifiers that may be used according to the present disclosure particle include fatty acid amines, fatty acid salts, petroleum sulfonates, lignosulfonates, oil soluble surfactants, and combinations thereof.

Non-limiting examples of viscosifiers in the particle include HEC, sulfonated polystyrene, phosphate esters, poly (acrylamide-co-dodecylmethacrylate), PVA, xanthan gum, guar gum, crosslinked polymers, acrylamides, CMHPG, locust bean gum, karaya gum, gum traganth, and combinations thereof.

Non-limiting examples of gases that may be used according to the present disclosure include $CO_2$, $N_2$, $O_2$, and combinations thereof.

In one or more embodiments, the cargo component of the particles can be configured to undergo a change and/or form a product when delivered to the site of interest and encountering the conditions present therein. For example, the cargo can comprise two or more components that are non-reactive at standard conditions but that are reactive when encountering the surrounding environment in the delivery site. Thus, upon contact with the environment, the cargo can undergo a chemical reaction to produce a product. As a non-limiting example, the reaction product can be a material that is more safely formed in situ than used in the final state to form the particles to be delivered. In another non-limiting example, the reaction can generate heat and/or the reaction product can itself be reactive with other materials present in the delivery site. Generation of heat can be useful, for example, to enhance oil mobility. As yet another non-limiting example, the reaction can be configured for production of a gas, such as $CO_2$, which can be useful to enhance oil mobility.

Particles useful in the compositions, systems, and methods of the present disclosure can have a variety of different structures. Specifically, the manner of combination of the cargo with the outer shell can vary. The particles preferably are substantially spherical; however, the particles may be irregularly shaped. The particles can have an outer surface, and the particles can be configured such that the outer shell forms at least a portion of the outer surface. In some embodiments, however, the cargo component can form up to 50% (+/−5%) of the area of the outer surface. In some embodiments, the cargo component can be completely surrounded by the outer shell. In further embodiments, the cargo component can be substantially embedded in the outer shell. In one or more embodiments, the particles can comprise the outer shell, the cargo, and one or more further components, such as an encapsulating layer that can substantially surround the particle, or such as a matrix material with which the cargo component can be combined. Non-limiting examples of the types of particles that can be encompassed by the present disclosure are further described below in relation to FIG. 1 through FIG. 4. As can be seen, the particle systems can be mononuclear, polynuclear, matrix, or combinations thereof.

In FIG. 1, the particle 10 is formed of an outer shell 12 that is substantially in the form of a shell surrounding a cargo 14 that is substantially in the form of a core that substantially fills the interior of the particle. The cargo 14 can be a single chemical, a plurality of chemicals, a single composition, or a plurality of compositions.

Figure 2:
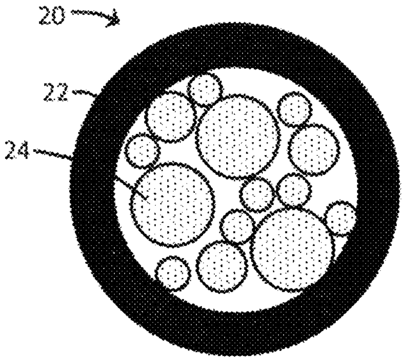
FIG. 2 shows a cross-section of a multi-component particle according to one or more further embodiments of the present disclosure.
Figure 3:
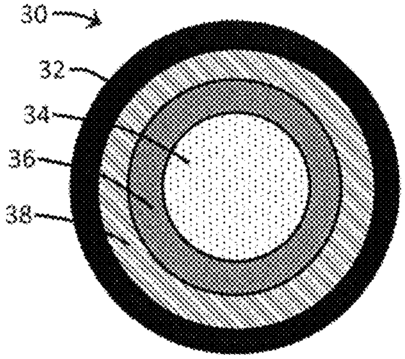
FIG. 3 shows a cross-section of a multi-component particle according to one or more further embodiments of the present disclosure.

In FIG. 2, the particle 20 is formed of an outer shell 22 that is substantially in the form of a shell surrounding a cargo 24 that is retained within the open core defined by the outer shell. Although the cargo 24 is illustrated as a plurality of units, it is understood that the cargo can be substantially a single unit. Further, a plurality of different cargo components can be included as a plurality of units within the open core of the outer shell.

In FIG. 3, the particle 30 is again formed of an outer shell 32 that is substantially in the form of a shell surrounding a cargo 34. The particle 30 also includes a first intermediate layer 36 and a second intermediate layer 38. Each of the intermediate layers can have a different composition. The intermediate layers can function as a shell or as a cargo. As such, the particle 30 can provide different types of release and/or can provide release of different types of cargo. For example, the outer shell 32 can degrade so that a cargo material in the second intermediate layer 38 can be first released, a cargo material in the first intermediate layer 36 can later be released, and the main cargo 34 can finally be released. The intermediate layers can provide a variety of further functions that may specifically alter release of the cargo.

Figure 4:
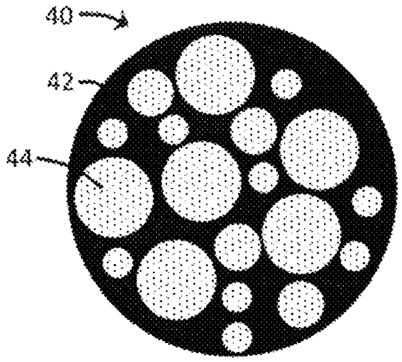
FIG. 4 shows a cross-section of a multi-component particle according to one or more further embodiments of the present disclosure.

In FIG. 4, the particle 40 is formed of a plurality of outer shell units 42 surrounding a cargo 44 that is substantially in the form of a core. For example, such particles can be formed as a Pickering emulsion whereby solid particles of the outer shell stabilize an emulsion of the cargo component.

In one or more embodiments, particles according to the present disclosure can comprise varying amounts of cargo and outer shell. It should be noted, that the particle configurations as described herein above are not meant to be limiting, and it is known in the art that various other particle configurations can and may be used in various embodiments of the present disclosure. The total cargo component can comprise about 5% by weight to about 100% by weight of the particles based upon the total particle weight. In various embodiments, the cargo concentration can be any of the following: about 5% by weight to about 95% by weight; about 10% by weight to about 90% by weight; about 25% by weight to about 75% by weight, about 35% to about 60% by weight; about 25% to about 99% by weight; about 40% by weight to about 95% by weight; about 50% by weight to about 90% by weight; about 50% by weight to about 99% by weight; about 60% by weight to about 99% by weight; about 70% by weight to about 99% by weight; or about 80% by weight to about 99% by weight. In some embodiments, the particles can consist essentially of the cargo component or can consist of the cargo component. Particles consisting essentially of the cargo component can include, for example, labile crosslinking groups that crosslink one or more layers of the cargo component together to provide for controlled release through breaking of the crosslinks in situ. In each of the above cargo concentration ranges, the remaining content of the particles can be formed by the outer shell; however, additional materials may also be included. The outer shell, for example, can comprise about 1% by weight to about 95% by weight, about 25% by weight to about 75% by weight, or about 40% by weight to about 65% by weight of the particles, based on the total weight of the particles.

The material(s) used in forming the outer shell of the particles preferably are configured to resist breakdown or degradation for a time so that delivery of the cargo can be delayed as desired, even in harsh environments. The materials preferably impart chemical and/or mechanical properties to the particle or the outer shell thereof such that the cargo can be released substantially only at the desired time after delivery. For example, the outer shell-forming material can be configured for degradation under one or more conditions (e.g., thermal and/or physical degradation), and the cargo can be released from the particle when the outer shell at least partially degrades. In one or more embodiments, degradation can proceed via hydrolytic degradation. In some embodiments, hydrolytic degradation may proceed in the presence of heat in the mechanism.

In order to provide control of the degradation, the outer shell can be formed so as to include one or more chemical functionalities. For example, in some embodiments, the outer-shell forming material can include polymers with hydrolytically cleavable ester groups that degrade with time to allow for release of components within the outer shell. Alternatively, in other non-limiting examples, the outer shell-forming material can further include polymers with hydrolytically cleavable groups that degrade with time such as polyesters, polyurethanes, polyamides, poly(dialkyl siloxanes), and polycarbonates. In a preferred example, the hydrolytically cleavable group can reside in the polymer main chain structure resulting in chain scission after hydrolysis. In one non-limiting example, the outer shell can include polymers that thermally degrade such as polyesters, polyurethanes, polyamides, poly(dialkyl siloxanes), and polycarbonates. In one non-limiting example, the outer shell can contain a thermal labile group, such as an azo compound, that degrades at a defined temperature. The outer shell particularly can be configured such that thermal degradation proceeds at a temperature of about 40° C. or greater, about 50° C. or greater, about 60° C. or greater, about 70° C. or greater, or about 80° C. or greater.

In some embodiments, the outer shell can include one or more components configured to degrade upon contact with a further material. For example, as noted above, the outer shell component of the particles can be formed of a degradable polymeric system. As a non-limiting example, the use of such degradable polymeric systems in the outer shell can be useful for controlled release of cargo via outer shell degradation upon contact with water. In some embodiments, one or more ester groups also can be utilized for such mechanism. In some embodiments, the one or more ester groups may be linked to the epoxy backbone of the first or second epoxy-containing monomer. In some embodiments, the degradability of the polymeric system may be tunable based upon the weight percentage of the polymeric system that is formed by the epoxy-containing monomer including the one or more ester groups. For example, the amount of the ester-based epoxy-containing monomer can be adjusted such that the degradable polymeric system degrades at a desired temperature releasing the cargo components within.

In one or more embodiments, the outer shell can be configured to remain substantially intact at the point of delivery, even in a harsh environment such as a petroleum formation; however, the outer shell can be further configured to release the cargo over time. As a non-limiting example, the outer shell may surround a core wherein the cargo is retained, and the outer shell can be configured so that the cargo may diffuse therethrough over time. In one or more embodiments, diffusion may be substantially absent under standard conditions (e.g., up to a minimum temperature, such as up to about 40° C., up to about 50° C., or up to about 60° C., or up to a minimum pressure, such as up to about 20 psi, up to about 50 psi, or up to about 100), but diffusion may be present when such standard conditions are exceeded.

In some embodiments, delayed release of a cargo component can be measured from the time the particles are prepared, from the time of first delivery of the particles (e.g., the beginning of pumping down a wellbore), or from the time that the particles first encounter the conditions of the desired delivery location (e.g., the conditions of a petroleum formation). Delayed release can be for a time of about 1 hr or greater, about 2 hrs or greater, about 4 hrs or greater, about 8 hrs or greater, about 12 hrs or greater, about 24 hrs or greater, about 2 days or greater, about 3 days or greater, about 4 days or greater, about 5 days or greater, about 1 week or greater, or about 2 weeks or greater. In each instance, the maximum time of delayed release can be about 3 weeks, about 4 weeks, or about 6 weeks. In particular embodiments, delayed release can be a time of about 1 hr to about 1 week, about 2 hrs to about 5 days, about 4 hrs to about 2 days, or about 8 hrs to about 24 hrs. Sustained release can be calculated from the time cargo release begins, from the time of first delivery of the particles, or from the time that the particles first encounter the conditions of the desired delivery location. In some embodiments, release can be delayed as noted above and also be sustained once release begins. Sustained release can proceed for a time of about 12 hrs or greater, about 24 hrs or greater, about 2 days or greater, about 3 days or greater, about 4 days or greater, about 5 days or greater, about 1 week or greater, or about 2 weeks or greater. In each instance, the maximum duration of sustained release can be about 3 weeks, about 4 weeks, about 6 weeks, or about 12 weeks. In particular embodiments, sustained release can be a time of about 12 hrs to about 6 weeks, about 24 hrs to about 4 weeks, or about 2 days to about 2 weeks.

In one or more embodiments, the disclosure can relate the nature of the compositions and systems to the conditions to which they are subjected. More particularly, the compositions and systems can exhibit a first set of characteristics and/or functions under a first set of conditions and can exhibit a second set of characteristics and/or functions under a second set of conditions. The first set of conditions (which may be referred to as "standard conditions") can be conditions under which the particles are prepared and/or stored, and the second set of conditions can include conditions present at the location where the particles are delivered. The first set of conditions, for example, can be approximately room temperature and pressure. The second set of conditions, for example, can be conditions encountered in a petroleum formation. As discussed above, release of cargo from the particles can be dependent upon the conditions encountered by the particles. Specifically, degradation of the outer shell may be substantially absent under the first set of conditions but be present under the second set of conditions. Similarly, diffusion may be substantially absent under the first set of conditions but be present under the second set of conditions. The second set of conditions may thus be characterized as the conditions under which cargo release may proceed.

In some embodiments, the conditions under which cargo release may proceed can particularly relate to temperature. For example, cargo release may be provided at temperatures of about 40° C. or greater, about 50° C. or greater, about 60° C. or greater, about 70° C. or greater, about 80° C. or greater, about 90° C. or greater, or about 100° C. or greater. In some embodiments, such temperatures can have an upper bound that is consistent with the average maximum temperature of a petroleum formation. More particularly, cargo release may be provided at temperatures of about 40° C. to about 250° C., about 50° C. to about 225° C., about 60° C. to about 200° C., or about 70° C. to about 180° C.

In some embodiments, the conditions under which cargo release may proceed can particularly relate to pressure. For example, cargo release may be provided at pressures of about 20 psi or greater, about 100 psi or greater, about 500 psi or greater, about 1,000 psi or greater, about 2,000 psi or greater, about 3,000 psi or greater, or about 5,000 psi or greater. In some embodiments, such pressures can have an upper bound that is consistent with the average maximum pressure of a petroleum formation. More particularly, cargo release may be provided at pressures of about 20 psi to about 15,000 psi, about 50 psi to about 12,000 psi, about 100 psi to about 10,000 psi, or about 250 psi to about 5,000 psi.

As further examples, the conditions under which cargo release may proceed can particularly relate to pH. In particular, cargo release may proceed when the particles are subjected to a pH change (increase or decrease) of at least about 1, at least about 2, or at least about 4. The pH change can be a change of about 1 to about 12, about 1.5 to about 10, or about 2 to about 8.

As yet further examples, in some embodiments, the conditions under which cargo release may proceed can particularly relate to shear. In particular, the particles may be configured to be substantially stable when subjected to relatively low shear conditions but be configured for cargo release when subjected to a shear of at least 1,000 $s^{-1}$, at least 5,000 $s^{-1}$, or at least 10,000 $s^{-1}$. For example, shear rates that may cause release of the cargo can be about 1,000 $s^{-1}$ to about 12,000 $s^{-1}$, about 1,500 $s^{-1}$ to about 10,000 s', or about 2,000 $s^{-1}$ to about 8,000 $s^{-1}$. It should be noted, that such shear conditions are not required to release the cargo, but may, in some embodiments, facilitate or contribute to the release of various cargo components.

As still further examples, the conditions under which cargo release may proceed can particularly relate to salinity. In particular, the particles may be configured to be substantially stable when subjected to relatively low salinity conditions but be configured for cargo release when subject to increased salinity conditions, such as being subjected to salinity conditions of about 1,000 ppm or greater total salt content, about 10,000 ppm or greater total salt concentration, or about 50,000 ppm or greater total salt concentration, the ppm being based on weight. For example, salinity conditions that can cause cargo release can be about 1,000 ppm to about 300,000 ppm total salt content, about 1,500 ppm to about 200,000 ppm total salt content, or about 2,000 ppm to about 100,000 ppm total salt content.

The second set of conditions under which cargo release can occur can encompass any one of the conditions noted above in the ranges noted above. The second set of conditions under which cargo release can occur can encompass two or more of the conditions noted above in the ranges noted above. For example, cargo release can occur based on any one of the temperatures, pressures, pH ranges, shear rates, and salt concentrations noted above. In some embodiments, cargo release can occur when the particles are subject to any of the following combinations of conditions noted above: temperature and pressure; temperature and pH; temperature and shear; temperature and salinity; pressure and pH; pressure and shear; pressure and salinity; pH and shear; pH and salinity; shear and salinity; temperature, pressure, and pH; temperature, pressure, and shear; temperature, pressure, and salinity; temperature, pH, and shear; temperature, pH, and salinity; temperature, shear, and salinity; pressure, pH, and shear; pressure, pH, and salinity; pressure, shear, and salinity; pH, shear, and salinity; temperature, pressure, pH, and shear; temperature, pressure, pH, and salinity; temperature, pressure, shear, and salinity; temperature, pH, shear, and salinity; and pressure, pH, shear, and salinity.

The particles may vary in size and may be defined as microcapsules/microparticles or nanocapsules/nanoparticles. The particles may have an average size (e.g., diameter) of less than about 5 μm, less than about 1 μm, less than about 500 nm, or less than about 100 nm. In some embodiments, the particles can have an average size of about 20 nm to about 5 mm, about 30 nm to about 1 mm, about 40 nm to about 500 μm, about 50 nm to about 5 μm, or about 100 nm to about 900 nm. It is particularly beneficial according to the present disclosure to be able to provide controlled release particles (e.g., in a core/shell configuration or other cargo/vehicle configuration) in a sub-micron form.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims.

As used herein with respect to an identified property or circumstance, "substantially" refers to a degree of deviation that is sufficiently small so as to not measurably detract from the identified property or circumstance. The exact degree of deviation allowable may in some cases depend on the specific context.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

Examples

Technology intended for use in downhole applications for oil and gas recovery needs to withstand harsh conditions such as high salinity, high temperature, and high pressure. For oil recovery techniques via chemical delivery, it is also imperative that the reactive cargo responsible for "loosening" the oil reaches its underground destination intact and only releases said cargo under specific conditions. Thermosets are known for their physical and chemical robustness and degradation is usually not considered a positive attribute. However, by taking advantage of the hydrolytically cleavable ester backbone of some ester-based epoxy-containing monomers it is possible to tune epoxy degradation of a degradable polymeric system in downhole conditions through crosslink network formulation.

Sample Preparation

In preparing samples for high pressure and high temperature testing (HPHT), epoxy monomers Epalloy 5200 (epoxy equivalent weight of 170, hereinafter referred to as "5200") and Epon 862 (epoxy equivalent weight of 169, hereinafter referred to as "862") were mixed in a 1:1 stoichiometric M (wt. or mol. %) ratio with triethylenetetramine (amine hydrogen equivalent weight of 24.5, hereinafter referred to as "TETA") to form five sample ratios of 5200:862, which had weight percentages of 100:0, 80:20, 60:40, 20:80, and 0:100. All samples contained 10 weight percent Heloxy 67 (epoxy equivalent weight of 130.5) as a diluent. All formulations consisted of a final total mass equal to 50 g and were thoroughly mixed and degassed prior to curing.

Next, a custom mold was made to fabricate rectangular epoxy bars. Cavities of approximately 35 mm×12.5 mm×3.175 mm were cut into 20 cm×20 cm pieces of food-grade high-temperature silicone sheets (3.175 mm thickness; manufactured by McMaster-Carr). The silicone sheets were then placed on a 7 mm thick glass plate (manufactured by McMaster-Carr) and coated with Frekote 770-NC (manufactured by Loctite) release agent, and an epoxy blend was poured into the mold cavities. A second Frekote-coated glass plate was placed on top of the silicone sheet and the filled mold base-plate. All three pieces were held together with 2 clamps along each of the four edges. The mold was placed vertically in a temperature controlled forced air oven for three hours at 100° C. with a 1-hour post-cure at 110° C. After fabrication the epoxy sample sets were stored in a lab freezer at −20° C.

Next, the fabricated epoxy bars were mechanically scribed with identification labels prior to being tested. Small bags large enough to fit three bars samples were fabricated using a heat sealing apparatus (manufactured by Aircraft Spruce #7400). The bars and enough American Petroleum Institute (API) brine (8% NaCl/2% CaCl by weight in deionized water, representative of downhole salinity, about 5-10 mL), were added to the bag. The bags were sealed, marked, and placed in a second fabricated bag. These bags were loaded into a HPHT consistometer (Model 275; manufactured by Fann) sample chamber which was then filled with oil thereby ensuring that the epoxy samples were completely submerged in the pressure transmitting fluid. Once the sample chamber was loaded into the instrument, it was programmed to reach 100° C. and 69 MPa (conditions of "HPHT" exposure), and to maintain these conditions for either one, three, or seven days. After the test period was complete, the sample bags were then removed, washed with soap and water (to remove external oil), and the epoxy bars were removed and gently patted dry prior to characterization.

Instrumentation and Testing

A Q800 Dynamic Mechanical Analyzer (TA Instruments) was used to measure the mechanical properties of the epoxy blends for the samples without any HPHT exposure. Characterization of post-HPHT samples was performed using differential scanning calorimetry (DSC). The rectangular epoxy pieces described above were used for dynamic mechanical analysis (DMA) trials. A single cantilever configuration was used with frequency and amplitude of 1 Hz and 5 μm, respectively. The temperature ramp was programmed to sweep from −20° C. to 180° C. at 2° C./min and glass transition temperatures ($T_g$) were acquired from the peak maximum of the tan delta curve.

Small chips of the cured rectangular epoxy bars (5-10 mg in Tzero aluminum pans, crimp sealed) were used DSC measurements (Q200, RCS90 Cooling, manufactured by TA Instruments). As a first step, samples were annealed in the instrument and cooled to −20° C. then heated to 180° C. at a rate of 10° C./minute. The samples were then held at 180° C. for 5 minutes, cooled to −20° C., and lastly heated to 180° C. at a rate of 10° C./min. For all $T_g$ values reported, the value of $T_g$ was assigned as the midpoint of the transition region between the glass and liquid line on the heat flow curve using the instrument analysis software, manufactured by TA Universal Analysis. For unaged epoxy samples with less water absorbed, $T_g$ on the first and second heating step could be observed. However, as the monomeric ester content and HPHT ageing time increased, the epoxy samples absorbed increasing amounts of water resulting in a first $T_g$ that was either lower than the thermal limits of the DSC program or obscured by an endotherm associated with water evaporation. Where the first $T_g$ was obscured, a second DSC program was used to isolate areas of the heat flow curve so that the first $T_g$ could be observed. In this method, samples were heated at a faster rate of 20° C./minute with a heat/cool/heat cycle from −40 to 100° C.

Mass (via balance), thickness (via calipers), and hardness (via Shore durometer: type D scale) were measured before and after the rectangular epoxy samples were placed in the HPHT. Sample exteriors were briefly wiped dry with a kimwipe following HPHT exposure before any measurements were made. Each time point recorded is an average of three samples at the corresponding ratio; thickness and hardness measurements were taken at three different locations along each individual sample and aggregated for each time point.

A Q50 instrument (manufactured by TA Instruments) was used to perform thermogravimetric analysis (TGA) measurements Small pieces (5-10 mg) were cut from the rectangular epoxy samples used for each time point of the HPHT trials. The TGA experiments were performed in a nitrogen gas atmosphere with a ramp rate of 10° C./min from 30° C. to 600° C. after jumping to 30° C. at the beginning. The jump step is critical as the ester-epoxy samples that absorbed moisture will begin to lose a non-negligible mass before any heating due to water evaporation from the nitrogen stream.

Results

Figure 5:
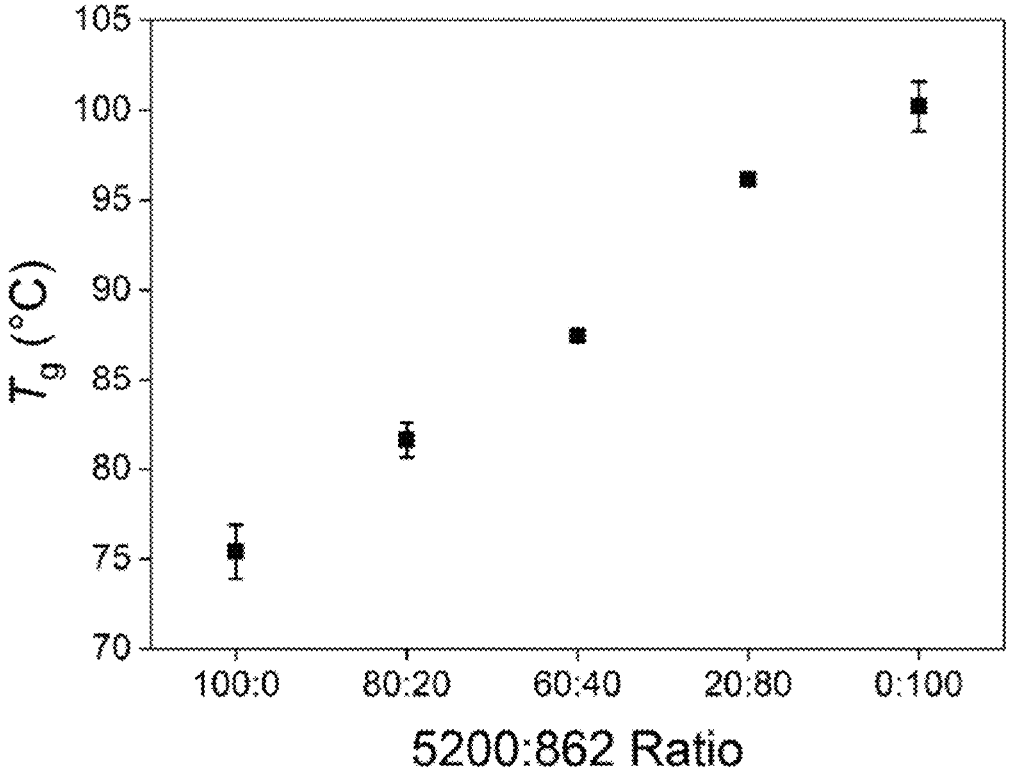
FIG. 5 shows a graph of the of the relationship between ester content by weight and $T_g$ prior to high pressure and high temperature exposure of particles prepared according to the methods provided herein.

FIG. 5 illustrates the inverse relationship between $T_g$ and ester content in the neat epoxy formulations, prior to high temperature or high-pressure treatment, as measured from the onset of the storage modulus curves from DMA.

As noted above, by taking advantage of the hydrolytically cleavable ester backbone of Epalloy 5200 (see, e.g., "5200" in FIG. 5) it is possible to tune epoxy degradation in downhole conditions through crosslink network formulation (FIG. 5 also shows Epon 862, the other epoxy-containing monomer adjusted in the final ratio). FIG. 5 illustrates a linear relationship between ester content and $T_g$ prior to ageing (t=0). Values are taken from DMA curves at the storage modulus onset (n=3). It is noted in FIG. 5 that $T_g$ increased as the ester content was decreased. Without intending to be bound by such theory, it is believed that this inverse relationship is likely attributable due to the increase in aromatic content of the crosslinks.

Figure 6:
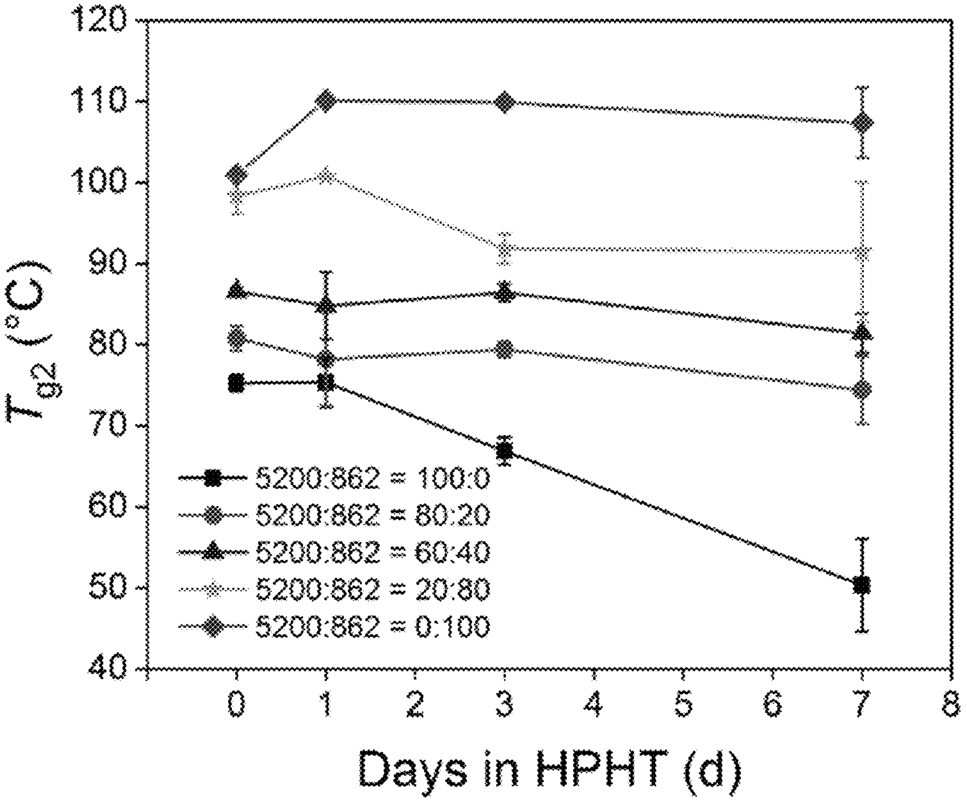
FIG. 6 shows a graph of the second heat cycle $T_{g2}$ values of epoxy formulations, prepared according to the methods described herein, relative to the number of days exposed to high pressure and high temperature conditions.

FIG. 6 illustrates epoxy formulation ratios and $T_g$ values (via DSC) corresponding to days in HPHT (100° C., 69 MPa, n=3). These values are reported based on the second heat cycle of −20° C. to 180° C.

Samples of 5200:862 formulations were subject to downhole conditions (e.g., immersed in a brine solution at 100° C. and 69 MPa) for seven days and analyzed for degradation at one, three and seven days. FIG. 6 shows the $T_g$ (via DSC) of the various 5200:862 ratios as a function of time subjected to HPHT conditions. Note that temperatures here are labelled as $T_{g2}$ to specify they were collected during the second DSC thermal cycle and thus correspond to the $T_g$ of the network following removal of any water in the system. As with DMA data, the $T_{g2}$ of the formulations prior to ageing (t=0 days) decreased with increasing 5200 content indicating a weaker/softer starting material. The largest decrease in $T_{g2}$ with respect to ageing time was seen with the 100% 5200 sample, a decrease of 33.1% (from 75.24° C. to 50.33° C.) after seven days in HPHT indicating some weakening of the thermoset structure due to possible ingress of water under high pressure and high temperature conditions.

Comparatively, the mixture ratios of 5200:862=80:20, 60:40, and 20:80 only experienced modest decreases in $T_{g2}$ from 80.79° C. to 74.40° C. (7.9%), 86.54° C. to 81.40° C. (5.9%), and 98.32° C. to 91.45° C. (7.0%), respectively, indicating a minimal change to chemistries of the crosslinks after moisture is removed (following the second thermal treatment in the DSC cycle). The 100% 862 sample had a slight increase in $T_{g2}$ (6.4%) from 100.9° C. to 107.4° C. which, without intending to be bound by this theory, may have been due to the reduction of voids in the crosslinked bisphenol network after the administration of pressure at a temperature so close to the $T_g$ of the polymer. Without intending to be bound by this theory, this could also be why the $T_{g2}$ of the 5200:862=20:80 sample undergoes a small increase after one day in HPHT but subsequently decreases as there are enough ester groups in the network to allow for degradation. Additionally, since there was no exotherm produced above the reported $T_{g2}$ values even as the DSC cycle ramped to 180° C., it is unlikely any thermally induced post-curing is occurring.

FIG. 7 illustrates a list of $T_g$ values for the 5200:862 formulations after one-day exposure at 100° C. and 69 MPa (n=3).

While the $T_{g2}$ portrays the crosslink environment post-ageing and without the presence of moisture (since the first DSC thermal cycle would have removed any absorbed moisture from the samples), a more accurate representation of thermoset degradation behavior downhole would be to examine the $T_g$ of the samples prior to thermal cycling. These $T_{g1}$ values for the 5200:862 ratios before and after one day at HPHT are shown in FIG. 7; day three and day seven are not included due to a large endothermic peak obscuring most of the samples attributed to water evaporation. It should be noted that the $T_{g1}$ values at t=0 days in FIG. 7 are lower than the $T_{g2}$ values reported in FIG. 6 due to the absence of an initial heating cycle prior to data collection. After one day at 100° C. and 69 MPa, every formulation consisting of ester groups showed a decrease in $T_{g1}$ with higher ester content correlating to increasingly sharper declines in $T_{g1}$ with the 100% ester formulation showing the highest drop of more than 90% its original value. These values are a closer estimation of the epoxy behavior downhole under real-world conditions than the $T_{g2}$ values, as no post curing was performed after the samples were removed from the HPHT. The 5200 monomer allows for tunable degradation in the presence of water.

Qualitative evidence of mechanical degradation of the ester epoxy formulations was observed visually in all five formulations tested. However, after seven days' exposure to high pressure high temperature conditions, there was noticeable macroscale degradation of the epoxies. Degradation of 5200:862=100:0 to a liquid, supported by the sharp drop in $T_{g1}$ seen after just one day under these conditions was observed. The excessive heat and pressure applied to the ester epoxy allowed for an increase in the ingress rate of water, leading to accelerated cleavage of ester bonds. The degree to which this phenomenon occurs is predictably lessened as the degradable ester content is decreased. Following seven days at high temperature and pressure, the epoxy bars still maintained roughly the same rectangular form factor they had prior to exposure but were much rubberier with the 80:20 ratio exhibiting gelatin-like consistency and easily breaking in half. The 60:40 ratio was also rubbery but was not as susceptible to damage as the 80:20 ratio due to the lower ester content in the polymer backbone. Finally, 5200:862 ratios of 20:80 and 0:100, respectively, show negligible change post-HPHT for these low and no ester content formulations.

Figure 8A:
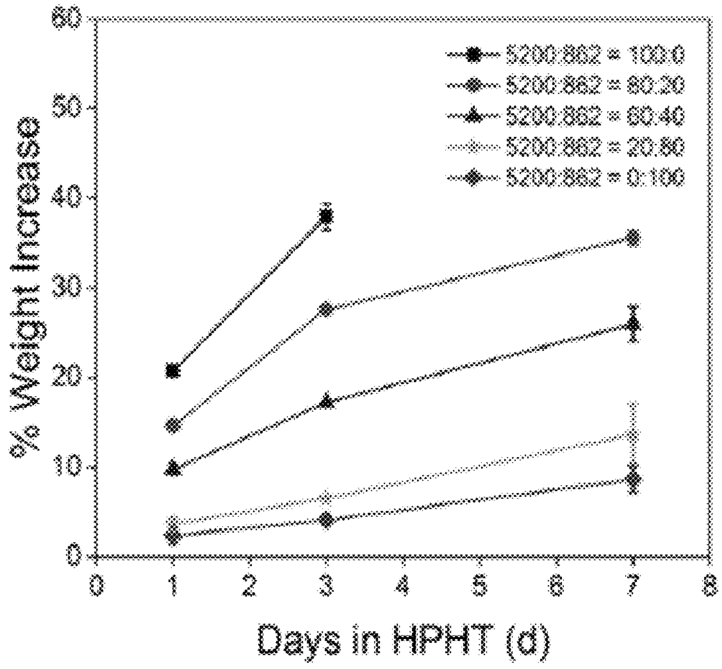
FIG. 8A shows a graph of the mass increase of all epoxy formulations, prepared according to the methods described herein, relative to the number of days exposed to high pressure and high temperature conditions.
Figure 8B:
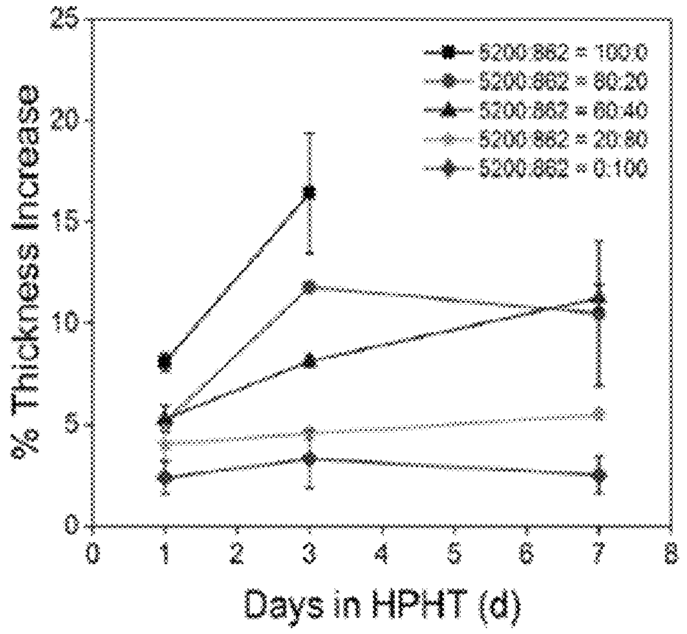
FIG. 8B shows a graph of the thickness increase of all epoxy formulations, prepared according to the methods described herein, relative to the number of days exposed to high pressure and high temperature conditions.
Figure 8C:
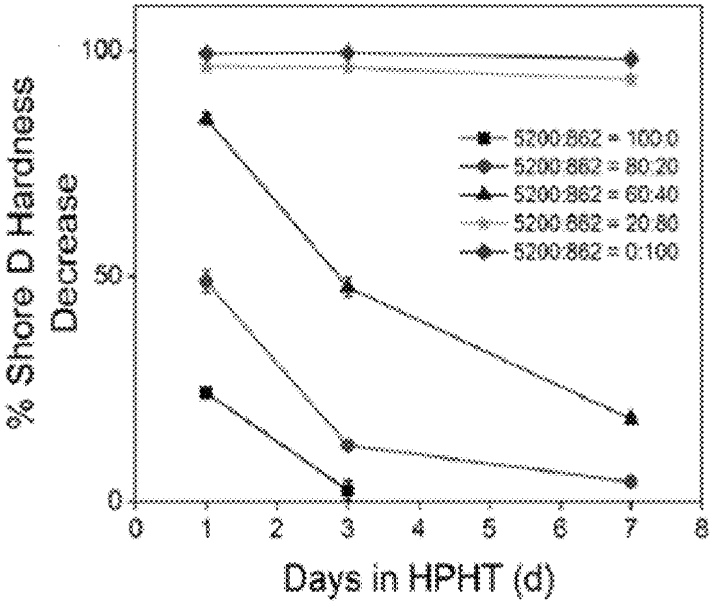
FIG. 8C shows a graph of the hardness increase of all epoxy formulations, prepared according to the methods described herein, relative to the number of days exposed to high pressure and high temperature conditions.

The above observations are quantitatively corroborated in FIG. 8A-FIG. 8C. FIG. 8A shows the percent weight increase of the epoxy formulations as a function of time spent at 100° C. and 69 MPa as retrieved by balance measurement. Note that there is no data for 5200:862=100:0 at seven days since the sample liquefied, as noted above, which made physical balance measurements impossible as the epoxy and brine solution were intermixed. In every case there was an increase in weight due to the uptake of water as the samples spent a longer amount of time in downhole conditions. This outcome was more pronounced as the ester content in the samples was increased. For example, after seven days' exposure to HPHT, the 5200:862=80:20 formulation gained 35.59±0.81% weight due to water uptake while the 5200:862=0:100 sample only gained 8.64±1.46% weight. Similarly, samples 5200:862=60:40 and 20:80 gained 25.96±1.95% and 13.67% respectively following seven days' exposure. Additionally, percent weight decrease due to water vaporization was analyzed via TGA (weight at 120° C.) and compared with the data in FIG. 8A. A similar trend is seen in which increasing weight change associated with the vaporization of water as the ester content of the 5200:862 ratios is increased, spanning 1.39±0.14% for the pure 862 sample to 60.93±0.27% for the pure 5200 sample after seven days under brine, heat, and pressure. The absolute weight change characterized by TGA was consistently lower when compared to the absolute weight change measured via balance at the same time point, but this could be due to the nitrogen stream the TGA samples were subjected to during the temperature ramp causing premature water vaporization.

Further investigation of the epoxy formulation physical properties (post cure), before and after exposure, support previous degradation data. FIG. 8B and FIG. 8C show the increase in thickness and decrease in hardness, respectively, of epoxy bars relative to t=0. Note again that the 5200:862=100:0 sample was omitted at t=7 days for these data as thickness and hardness measurements weren't appropriate for the liquefied product. Thickness of the sample bars increased as a function of both ester content and time immersed in saline HPHT conditions with the 100% ester sample swelling to over 15% its original thickness after three days' immersion, eventually dissolving completely. Without intending to be bound by such theory, this swelling was likely due to the dislocation of network fragments as water ingress increased and promoted hydrolytic ester cleavage. Indeed, the same sample showed negligible Shore D hardness (2.49±2.17% of the original hardness) essentially indicating sample destruction. Conversely, the 100% 862 sample retained 99.46±0.61% hardness after the same three-day exposure and ultimately retained 98.12±0.85% hardness after a full week. This is supported by a small 3.32±1.43% and 2.52±0.93% thickness increase after three and seven days HPHT exposure, respectively. Formulation variances in between these two extremes revealed predictable, tunable results. For example, from days one to seven, the thickness of samples with 80%, 60%, and 20% ester content increased from 5.14±0.29% to 10.49±3.58%, 5.29±0.65% to 11.25±0.63%, and 4.06±0.9% to 5.49±0.25%, respectively. Similar results for hardness decrease demonstrate the tunability of the 5200:862 mixture. For example, 5200:862 ratios of 80:20, 60:40, and 20:80 showed a decrease in hardness (relative to their unaged value) of 48.83±2.43% to 4.34±0.7%, 84.87±1.29% to 18.27±0.85%, and 96.43±0.40%, respectively, from day one to seven.

Figure 9A:
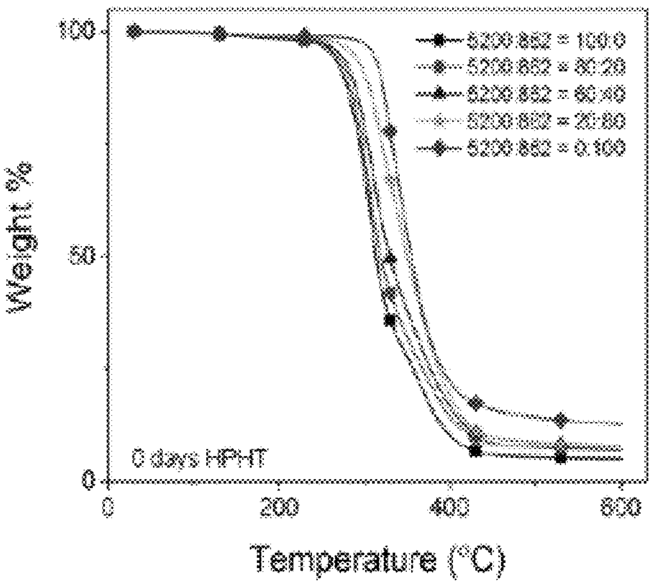
FIG. 9A shows a graph of the weight change and degradation of all epoxy formulations, prepared according to the methods described herein, prior to exposure to high pressure and high temperature conditions.
Figure 9B:
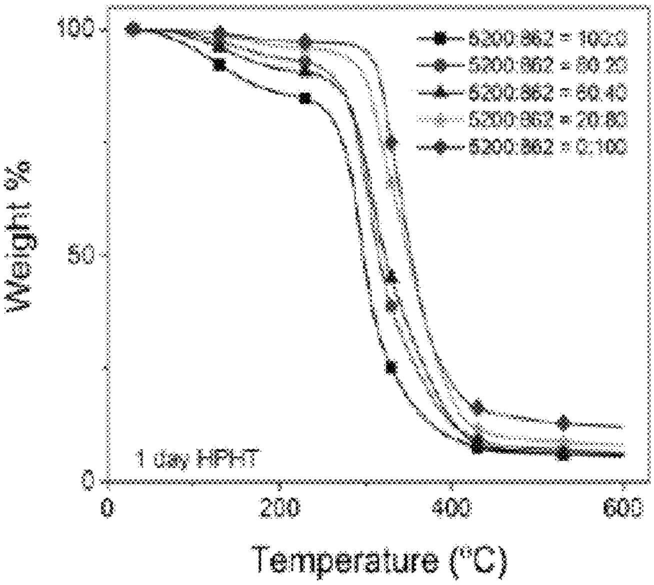
FIG. 9B shows a graph of the weight change and degradation of all epoxy formulations, prepared according to the methods described herein, one day of exposure to high pressure and high temperature conditions.
Figure 9C:
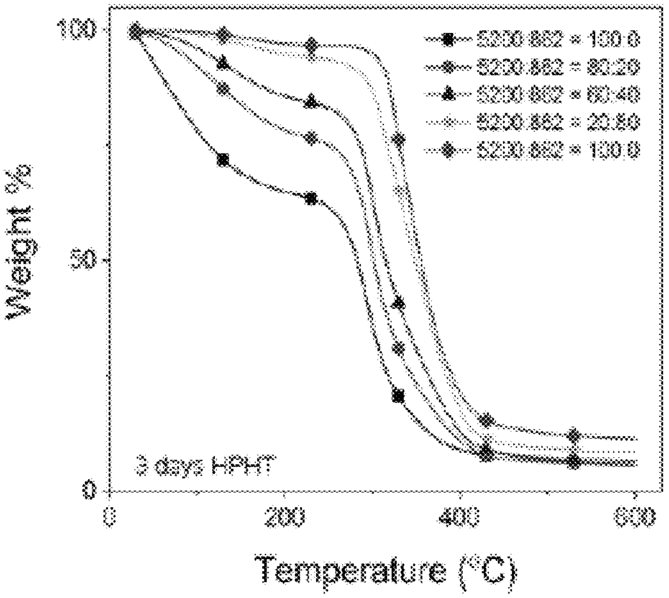
FIG. 9C shows a graph of the weight change and degradation of all epoxy formulations, prepared according to the methods described herein, after three days of exposure to high pressure and high temperature conditions.
Figure 9D:
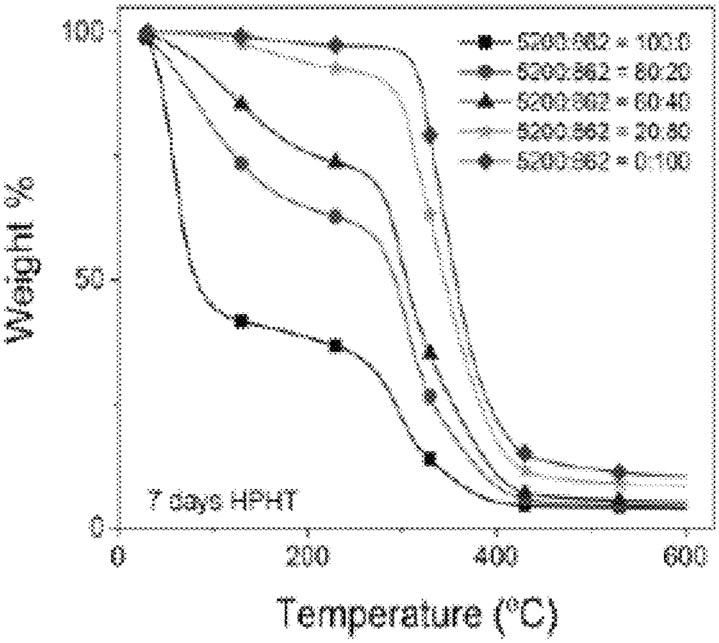
FIG. 9D shows a graph of the weight change and degradation of all epoxy formulations, prepared according to the methods described herein, after seven days of exposure to high pressure and high temperature conditions.

Thermographs are provided in the figures indicating the weight change and degradation of the 5200:862 ratios neat (FIG. 9A), after 1-day exposure (FIG. 9B), after 3 days' exposure (FIG. 9C), and after 7 days' exposure (FIG. 9D) at 100° C. and 69 MPa (n=3). After exposure to high temperature and an aqueous environment, the samples with higher ester content experienced decreased weight percentage due to the exposure to water. Weight loss due to exposure to water typically occurs below 100° C. and as the ester content is increased from 0% to 100%, the moisture content in the samples increased as a function of time (days), thus decreasing the weight percentage. This indicates hydrolytic degradation of the ester bonds in the epoxy. Meanwhile, the sample without any ester content (5200:862=0:100) had a negligible weight loss when exposed to the aqueous environment. As noted in this application, the ester content in these formulations can be tuned to degrade (and thus release the cargo contained therein) with respect to time.

The invention claimed is:

1. A delivery system comprising a plurality of particles that each comprise an outer shell and a cargo component that is retained by the outer shell, wherein the outer shell is a degradable polymeric system formed by crosslinking a curable composition comprising:

a combination of epoxy-containing monomers, a primary amine crosslinker, and an optional diluent, in an amount of up to 20 weight percent of the degradable polymeric system;

wherein the combination of epoxy-containing monomers is a combination of (i) a bisphenol-F diglycidyl ether monomer and (ii) a diglycidyl ester monomer, combined in a weight ratio, (i):(ii), of 20:80 to 80:20;

wherein the primary amine crosslinker is provided in a 1:1 stoichiometric ratio relative to the amount of epoxy groups present in the curable composition; and wherein the amount of (ii) the diglycidyl ester monomer present in the curable composition is selected to tune degradability of the degradable polymeric system.

2. The delivery system of claim 1, wherein the primary amine crosslinker is triethylenetetramine (TETA).

3. The delivery system of claim 1, wherein the outer shell is substantially in the form of a shell surrounding the cargo component that is substantially in the form of a core that substantially fills the interior of the particle; and wherein the cargo component is selected from a single chemical, a plurality of chemicals, a single composition, and a plurality of compositions.

4. The delivery system of claim 1, wherein the outer shell is substantially in the form of a shell surrounding the cargo component that is retained within an open core defined by the outer shell; and wherein the cargo component is selected from a single chemical, a plurality of chemicals, a single composition, and a plurality of compositions.

5. The delivery system of claim 1, wherein the particles further comprise a first intermediate layer and a second intermediate layer, wherein the intermediate layers are positioned between the outer shell and the cargo component, and the intermediate layers function as an additional shell or an additional cargo component.

6. The delivery system of claim 1, wherein the cargo component is controllably diffusible through the outer shell.

7. The delivery system of claim 1, wherein the degradable polymeric system is at least partially degradable via hydrolytic degradation.

8. The delivery system of claim 1, wherein the cargo component comprises at least one material selected from the group consisting of breakers, scale inhibitors, corrosion inhibitors, crosslinkers, surfactants, cement accelerators, acidizing agents, sensors, bactericides, formation damage control agents, emulsifiers, viscosifiers, and tracers.

9. The delivery system of claim 1, wherein the particles have an average size of about 5 μm or less.

10. The delivery system of claim 1, wherein the particles have an average size of about 1 μm or less.

11. The delivery system of claim 1, wherein the particles have an average size of about 500 nm or less.

12. A method for providing a cargo component to a petroleum reservoir, the method comprising delivering to the petroleum reservoir the delivery system according to claim 1, wherein the petroleum reservoir exhibits one or more conditions under which the plurality of particles release at least a portion of the cargo component.

13. The method of claim 12, wherein the petroleum reservoir exhibits one or more conditions under which the degradable polymeric system at least partially degrades.

14. The method of claim 13, wherein the degradation of the degradable polymeric system has been tuned by selecting the amount of (ii) the diglycidyl ester monomer present in the curable composition.

15. The method of claim 14, wherein the tuned degradable polymeric system is capable of providing a triggered release of specific cargo components.

* * * * *